United States Patent [19]

Hein

[11] 4,348,443
[45] Sep. 7, 1982

[54] RESILIENT STRIP AND METAL CARRIER THEREFOR

[75] Inventor: Richard D. Hein, Wabash, Ind.

[73] Assignee: The General Tire & Rubber Company, Akron, Ohio

[21] Appl. No.: 217,737

[22] Filed: Dec. 18, 1980

[51] Int. Cl.³ .............................................. E06B 7/18
[52] U.S. Cl. .................................... 428/122; 49/490; 52/716; 428/358
[58] Field of Search .................. 428/358, 122; 49/490; 52/716

[56] References Cited

U.S. PATENT DOCUMENTS

| 2,159,355 | 5/1939 | Goetze | 428/122 |
| 3,108,338 | 10/1963 | Stec et al. | 49/490 X |
| 3,198,689 | 8/1965 | Lansing | 428/122 X |
| 3,222,769 | 12/1965 | Le Plae | 52/716 X |
| 3,399,448 | 9/1968 | Jackson | 52/716 X |

FOREIGN PATENT DOCUMENTS

| 730900 | 3/1966 | Canada | 428/122 |
| 967113 | 8/1964 | United Kingdom | 428/122 |

Primary Examiner—Henry F. Epstein

[57] ABSTRACT

A resilient strip with a channel-shaped section that attaches to a flange on an automobile frame has improved metal carrier fixed to its channel-shaped section. The metal carrier has a continuous longitudinal web with sheet metal elements extending from either side that are triangular in shape. The triangular-shaped elements require only half the metal as the conventional rectangular elements, yet they have the same holding power for maintaining the resilient strip on the flange of the automobile body.

6 Claims, 4 Drawing Figures

RESILIENT STRIP AND METAL CARRIER THEREFOR

This invention relates to sealing and trim strips that are attachable to metal flanges. More particularly, the invention relates to a channel-shaped resilient strip of the type that fastens to a flange on the door or window frame of an automobile and to a metal carrier member that forms a part of the strip and helps maintain the strip fastened to the door flange.

There are basically two types of metal carriers for the resilient strips that are attached to flanges of automobile window and door frames. One is made of wir that is bent into loops so that it crosses back and forth from one side of the strip to the other, with fabric cords interlaced through the wire loops and running in the longitudinal direction of the strip. U.S. Pat. No. 3,198,689 to F. J. Lansing shows an example of this wire type of metal carrier. One disadvantage with this carrier is that it is difficult to maintain secured to a flange that bends in and out of different planes, such as where the flange of a car door frame bulges outwardly with respect to the side of the car. When the loops of the wire carrier are displaced laterally at such bends in the flange, they tend to spring back into a straight line and come off the flange. Another disadvantage with the looped wire carrier with woven fabric cords is the complexity of the manufacturing operations that involve bending the wire loops uniformly and weaving fabric cords through the loops.

The other major type of metal carrier is made of a strip of sheet metal that is slotted across its width to divide the carrier into a row of sheet metal elements. These metal elements are usually joined to opposite sides of at least one central web and they are bent into channel-shaped legs that grab against opposite sides of a flange on an automobile frame. The metal carrier may be either completely embedded in the resilient material, as shown in U.S. Pat. Nos. 3,222,769 to G. R. LePlae and 3,399,448 to N. C. Jackson or it may be fixed to the inside of the resilient material as shown in U.S. Pat. No. 3,108,338 to J. P. Stec et al. While this type of metal carrier is easier to manufacture and tends to stay on outwardly bulging door flanges better than the wire carrier, it too has several disadvantages. One is that it uses more metal to achieve the same holding power, and therefore weighs more. Also, the closely spaced elements of the strip can interfere with each other when the strip is bent around a convex corner. If the elements are spaced further apart to save weight and material and to alleviate the bending problem at convex corners, then their overall gripping power is reduced and the resilient strip is prone to coming loose from the flange.

The present invention solves these problems by means of a metal carrier member having a continuous, longitudinally extending web and sheet metal elements extending from opposite sides of the web that are essentially triangular in shape. The elements are preferably spaced a distance apart at their distal end portions substantially equal to the widths of the elements at their junctures with the web. This creates triangular shaped gaps that allow space into which the distal ends of the elements can move when the strip is bent at corners of a door or window opening. Also, a number of metal carrier members can be cut from the same sheet, with the triangular elements of one carrier blank nested in the triangular gaps between the elements of adjacent carrier blanks. This reduces the amount of waste metal made in producing the carrier, and cuts the total amount of metal used almost in half, because the total area of the triangular elements is approximately half that of rectangular elements, such as shown in U.S. Pat. No. 3,399,448.

At the same time, the holding power of the triangular elements is substantially the same as rectangular elements having twice the area. It is a well-known engineering principle that the bending moment at any given cross-section of a cantilever beam having a concentrated load at its distal end is directly proportional to the distance of the given cross-section from the distal end. Thus, the cross-sectional area of the beam can be reduced uniformly from the supported end to the distal end without increasing the maximum bending stress taken by the beam. It therefore follows that the maximum bending stress in triangular elements will be no greater than in rectangular elements, and the triangular elements will be able to maintain the same holding power as those of rectangular shape.

It is important that the triangular elements be attached to a continuous web and not connected simply to each other's end portions in such a manner that a zig-zag type of spring is created similar to that of the looped wire carriers. The metal carrier shown in Canadian Patent No. 730,900 and corresponding British Pat. No. 967,113, both granted to Bright Manufacturing Company, has elements that are of a triangular shape, but each element is divided into two legs that are not attached to any common web. In fact, there is no continuous web running the length of the carrier, and the joining of the element legs at alternate ends introduces a spring characteristic to the carrier that tends to pull the carrier off flanges which curve in and out of different planes. In contrast, the continuous web of the carrier of the present invention becomes permanently deformed when mounted on a curved flange and assumes a permanent shape that matches the curved shape of the flange. This allows the triangular elements attached to the web to grab the flange without interference from inherent spring forces in the web tending to pull the elements off the flange.

A metal strip of somewhat similar shape to the metal carrier of the present invention, but having a different function, is shown in U.S. Pat. No. 2,159,355 to H. Goetze. This metal strip is designed as a protective armoring for the edge of a gasket and consists of a continuous web with triangular elements extending from both sides of the web and bent almost perpendicular to the web to form a channel-shaped structure. The distal ends of the elements are bent inwardly toward each other, so that they form teeth that become embedded in the gasket material when the armoring strip is assembled on the gasket. Unlike the carrier of the present invention, the armoring strip of this patent does not serve as a holding means for a resilient strip on a rigid structural flange, and the triangular elements are not designed to create any gripping force on the gasket. Rather, they are held on by teeth that are sunk into the gasket material. Thus, these elements function in a different manner than those of the metal carrier member of the present invention.

In summary, the present invention resides in an improved elongated metal carrier member for holding the legs of an elongated resilient channel-shaped strip pressed against opposite sides of a rigid flange. The carrier member has a channel-shaped cross section with a continuous longitudinally extending web and a plurality of sheet metal elements extending laterally from both sides of the web and bent to form the legs of the channel-shaped cross section. The distal end portions of the sheel metal elements thus face in the same direction away from the web. The improvement in the carrier member is characterized by each of its sheet metal elements being relatively wide at the junctures of the elements with the web, and relatively narrow at their distal end portions. The side edges of the elements extend from the web and converge toward each other at the distal end portions. In the preferred embodiment, the gaps between the sheet metal elements are least as large as the areas of the elements themselves when the carrier member is in a straightened position with the web unflexed. More specifically, the preferred shape of both the gaps and the elements is substantially triangular, with the distances between the distal ends of the elements being substantially equal to the widths of the elements of the junctures of the elements with the web. In addition, the sheet metal elements preferably have holes spaced inwardly from their side edges to allow adjacent resilient strip material to partially fill the holes and form an interlock between the resilient material and the elements of the carrier member.

The invention also resides in a resilient strip having a channel-shaped portion and metal carrier as described above fixed to the channel-shaped portion.

The foregoing features, advantages, and objects of the present invention will be more apparent from the following detailed description and the attached drawings, in which.

Figure 1:
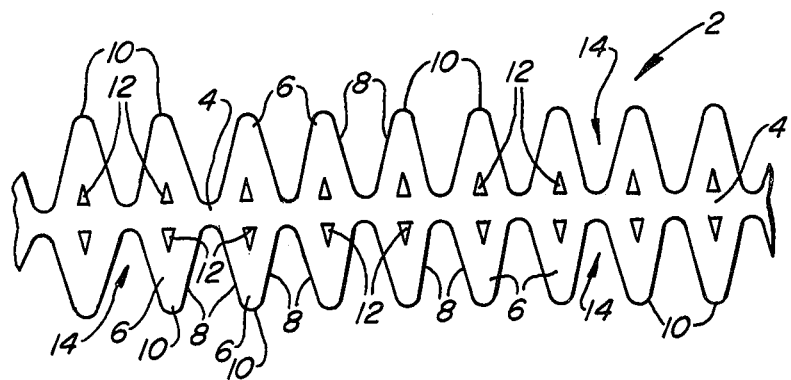
FIG. 1 is a plan view of a cut metal strip, or blank, from which metal carrier embodying the present invention is to be formed.
Figure 2:
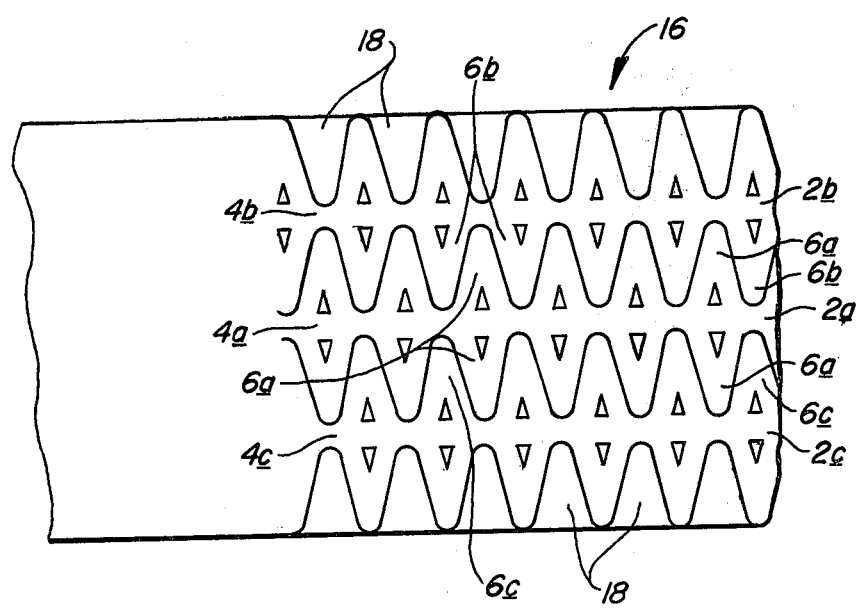
FIG. 2 is a plan view of a wide strip of sheet metal showing how several of the blanks of FIG. 1 can be cut from the same metal strip.
Figure 3:
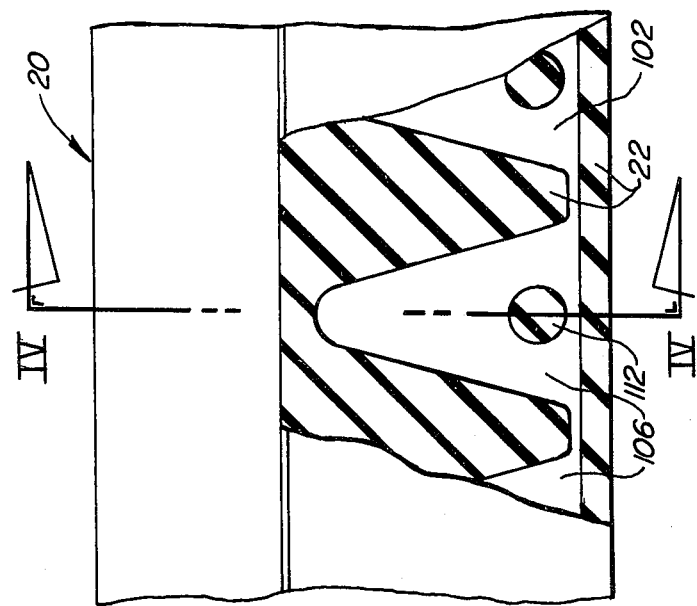
Figure 4:
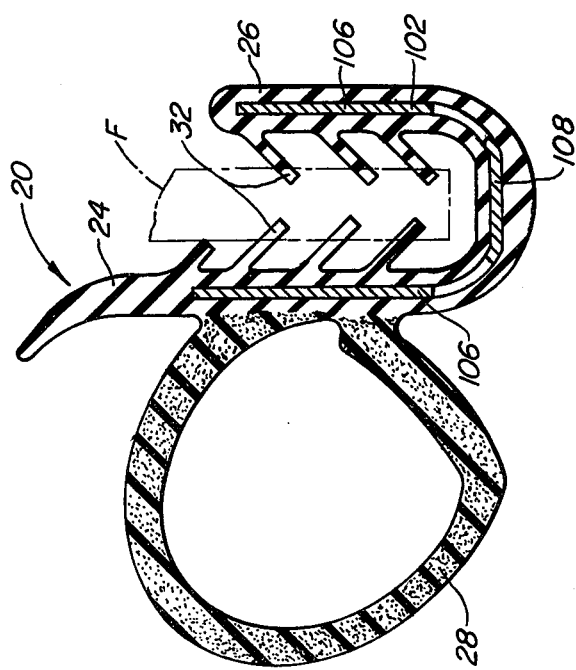

FIG. 3 is a side elevation of a reinforced resilient strip embodying the present invention, with a portion thereof broken away to show that the resilient strip includes a metal carrier formed from a blank like those shown in FIGS. 1 and 2, but with an alternate shape of holes punched in the elements of the carrier; and FIG. 4 is a cross-sectional view of the reinforced resilient strip of FIG. 3, taken along line IV—IV of FIG. 3.

The metal carrier blank 2 in FIG. 1 is made of sheet metal, preferably steel, and has a longitudinally extending web 4 and a plurality of elements 6 extending laterally from both sides of the web 4. Each of the elements 6 have side edges 8 that are relatively far apart at the juncture of the elements 6 with the web 4 and converge toward each other as they extend away from the web 8. The side edges 8 meet at distal ends 10 to give the elements 6 a triangular shape.

The elements 6 are preferably formed with holes 12 that are designed to be filled at least partially by resilient material of a surrounding strip structure. The holes 12 thus help interlock the carrier blank 2 to the strip in which it is used.

The triangular shape of the elements 6 leaves gaps 14 between the elements that are also of triangular shape. In this preferred embodiment, the distal ends 8 of the elements 6 are spaced from each other a distance equal to the widths of the elements 6 at their junctures with the web 4. With such spacing of the elements 6, a plurality of carrier blanks 2 can be cut from a single sheet 16, shown in FIG. 2, with the triangular elements 6a of one carrier blank 2a nested in the gaps between the elements 6b and 6c of adjacent carrier blanks 2b and 2c.

With the carrier blanks 2a, 2b and 2c being cut with their respective elements 6a, 6b and 6c nested as shown in FIG. 2, one can see that the amount of metal used in making the blanks is reduced to almost half that used in making a carrier blank with rectangular elements having the same lengths and same widths at the junctures of the elements with the web. The only factors that prevent the reduction of metal to exactly one-half are the widths of the narrow webs 4a, 4b and 4c, and the metal wasted at the edges of the sheet 16 in the form of triangular pieces 18. However, the pieces 18 will be less of a factor percentage-wise, if sheets wider than the sheet 16 are used, accommodating larger members of parallel blanks 2 nested next to each other.

The metal carrier blanks 2 shown in FIGS. 1 and 2 are used as reinforcement for a resilient strip, such as the strip 20, shown in FIGS. 3 and 4. In the side elevation of FIG. 3, a portion of the rubber material 22 is broken away to show the metal carrier 102 with triangular elements 106. As the cross-section of FIG. 4 shows, the carrier 102 is bent in a channel-shape to conform to the channel-shape of the resilient strip. The carrier 102 is essentially the same shape as the carrier blanks 2 of FIGS. 1 and 2, except that the elements 106 are provided with round holes 112, rather than triangular shaped holes. The holes 112 help to hold the carrier 102 from lengthwise movement within the strip 20, because the rubber of the strip 20 protrudes through the holes and locks the carrier 102 to the rubber.

Another minor difference between the blanks 2 of FIGS. 1 and 2 and the carrier 102 is that the elements 106 on one side of the carrier 102 are slightly longer than those on the other side. The elements 106 can be made of different sizes to accomodate resilient strips of various shapes, such as the strip 20 which has one leg 24 longer than its other leg 26. In this case, the leg 24 also has molded to it an elongated bulb 28 of sponge rubber. The channel shaped portion 30 of harder rubber, containing the reinforcing metal carrier 102 is designed to grasp the opposite sides of a metal flange F of an automobile door frame (shown in chain lines of FIG. 4), between the fingers 32 on legs 24 and 26, while the sponge rubber bulb 28 is designed to form a seal with the window glass on the door of the automobile.

As can be seen in FIG. 4, the triangular elements 106 of the carrier 102 play a key role in holding the strip 20 on the flange F of the automobile door frame. As the fingers 32 and legs 24 are pushed outwardly by the flange F, the metal elements 106 of the carrier 102 exert a spring force back against the flange to hold the legs 24 and 26 of the strip 20 gripped to the flange F. The total amount of spring force that can be generated is determined by the spring properties of the steel and the dimensions of the elements 106 where they join with the web 108 of the carrier 102. Since this dimension is the same for both rectangular and triangular shaped elements, the triangular shaped elements perform at well, while giving a saving of almost 50% in metal and weight of the carrier element. This results in a strip that is both less expensive and lighter than previous conventional carriers employing rectangular elements.

While several embodiments of the present invention has been shown and described, other embodiments and modifications will be apparent without departing from the scope of the appended claims.

I claim:

1. An elongated metal carrier member for holding the legs of an elongated resilient channel-shaped strip pressed against opposite sides of a rigid flange, said carrier member having a channel-shaped cross section with a continuous, longitudinally extending web and a plurality of sheet metal elements extending laterally from both sides of said web and bent to form the legs of said channel-shaped cross-section, said sheet metal elements having distal end portions facing in the same direction away from said web, each of said sheet metal elements having the property of reacting to being outwardly displaced by said rigid flange by exerting a gripping spring force inwardly toward said rigid flange, said carrier member having the improvement characterized by:

each of said sheet metal elements of said carrier member being relatively wide at the junctures of the elements with said web, and relatively narrow at said distal end portions, and having side edges that extend from said web and converge toward each other in the direction of said distal end portions.

2. The metal carrier member according to claim 1 characterized further by said sheet metal elements being spaced from one another by gaps that have areas at least as large as the areas of said sheet metal elements when said carrier member is in a straightened position with said web unflexed.

3. The metal carrier member according to claim 2 characterized further by said sheet metal elements and the gaps in between said elements being of a substantially triangular shape and size, with the distances between said distal ends of said elements being substantially equal to the widths of said elements at the junctures of the elements with said web.

4. The metal carrier member according to claims 1, 2, or 3 characterized further by said sheet metal elements having holes spaced inwardly from said side edges.

5. An elongated resilient strip having a channel-shaped portion and having a metal carrier member of channel-shaped cross-section fixed to said channel-shaped portion of the resilient strip, said metal carrier member having a continuous longitudinally extending web and sheet metal elements extending laterally from both sides of said web and bent to form the legs of said channel-shaped cross section, said sheet metal elements having distal end portions facing in the same direction away from said web, each of said sheet metal elements having the property of reacting to being outwardly displaced by said rigid flange by exerting a gripping spring force inwardly toward said rigid flange, said elastomeric strip having the improvement characterized by:

each of said sheet metal elements of said carrier member being relatively wide at the junctures of the elements with said web, and relatively narrow of said distal end portions, and having side edges that extend from said web and converge toward each other in the direction of said distal end portions.

6. The resilient strip according to claim 5 characterized further by said sheet metal elements having holes spaced inwardly from said side edges, and by the resilient material of said strip at least partially filling said holes to form an interlock between said resilient material and said elements of said carrier member.

* * * * *